United States Patent
Zhu (10) Patent No.: US 11,350,145 B2
(45) Date of Patent: May 31, 2022

(54) SMART DELIVERY NODE

(71) Applicant: Zhongwen Zhu, Saint-Laurent (CA)

(72) Inventor: Zhongwen Zhu, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/772,874

(22) PCT Filed: Dec. 19, 2017

(86) PCT No.: PCT/IB2017/058164
§ 371 (c)(1),
(2) Date: Jun. 15, 2020

(87) PCT Pub. No.: WO2019/122966
PCT Pub. Date: Jun. 27, 2019

(65) Prior Publication Data
US 2021/0168415 A1      Jun. 3, 2021

(51) Int. Cl.
*H04N 21/239*     (2011.01)
*G06N 3/04*       (2006.01)
(Continued)

(52) U.S. Cl.
CPC .......... *H04N 21/2393* (2013.01); *G06N 3/04* (2013.01); *G06N 3/08* (2013.01); *H04N 21/251* (2013.01);
(Continued)

(58) Field of Classification Search
CPC ............ H04N 21/2393; H04N 21/251; H04N 21/254; H04N 21/8586; H04N 21/218;
(Continued)

(56) References Cited

U.S. PATENT DOCUMENTS

| 6,542,964 B1* | 4/2003 | Scharber ................. H04L 29/06 711/122 |
| 2003/0229682 A1 | 12/2003 | Day |
| | | (Continued) |

FOREIGN PATENT DOCUMENTS

WO       2017149355 A1     9/2017

OTHER PUBLICATIONS

International Search Report and Written Opinion for PCT/IB2017/058164, dated Sep. 13, 2018; 14 pages.

*Primary Examiner* — Farzana Hossain
(74) *Attorney, Agent, or Firm* — Ericsson Canada Inc.

(57) ABSTRACT

A method, Delivery Node, DN, and Content Delivery Network, CDN, are optimized to deliver content of different categories. The DN is operative to receive a request for a content, obtain a determination of whether or not a category of content is associated with the requested content and responsive to the determination that no category of content is associated with the requested content, forward the request for the content towards an origin server and upon receiving a response from the origin server serve the content. The CDN comprises a plurality of DNs, a data processing service operative to obtain, from the DNs, and assemble, data sets into training and validation data formatted to be used for training and validating a Neural Network, NN. The CDN comprises a NN training service, operative to train and validate the NN and a configuration service, operative to configure the plurality of DNs with the trained and validated NN.

10 Claims, 8 Drawing Sheets

(51) Int. Cl.
  *G06N 3/08* (2006.01)
  *H04N 21/25* (2011.01)
  *H04N 21/254* (2011.01)
  *H04N 21/858* (2011.01)

(52) U.S. Cl.
  CPC ....... *H04N 21/254* (2013.01); *H04N 21/8586* (2013.01)

(58) Field of Classification Search
  CPC ......... H04N 21/2183; H04N 21/23103; H04N 21/23106; H04N 21/23109; H04N 21/23116; H04N 21/239; H04N 7/163; H04N 21/858; G06N 3/04; G06N 3/08; H04L 65/4084; H04L 67/1014; H04L 67/2842
  See application file for complete search history.

(56) References Cited

U.S. PATENT DOCUMENTS

| | | |
|---|---|---|
| 2010/0299722 A1 | 11/2010 | Tewari et al. |
| 2012/0198075 A1 | 8/2012 | Crowe et al. |
| 2015/0163318 A1 | 6/2015 | Bergman |
| 2018/0089556 A1* | 3/2018 | Zeiler ................. G06N 3/0454 |
| 2018/0341889 A1* | 11/2018 | Psalmonds ............... G06N 3/04 |

* cited by examiner

SMART DELIVERY NODE

TECHNICAL FIELD

The present disclosure relates to content delivery networks and delivery nodes.

BACKGROUND

Figure 1:
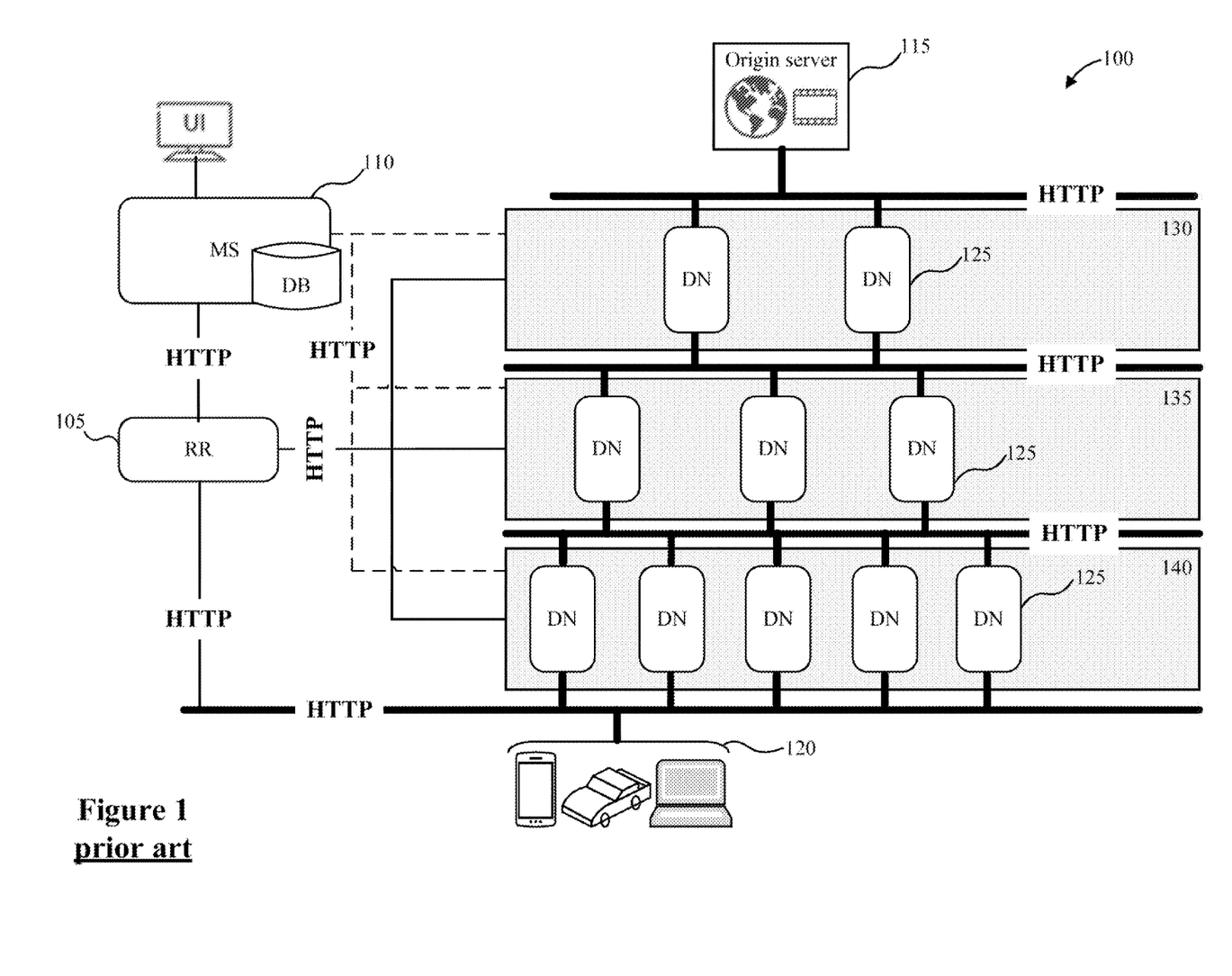
FIG. 1 is a schematic illustration of a CND of the prior art.

FIG. 1 illustrates a typical Content Delivery Network (CDN) 100 deployment. The CDN comprises a Request Router (RR) 105, Management System (MS) 110, Delivery Nodes 125 in Edge 140, Region 135 and Core 130 tiers as well as Origin server 115 and User Equipment or devices 120. The management system 110 can be accessed through a User Interface (UI). In the figure, bold lines represent traffic network, the thin lines control network and the dotted lines Operation, Administration and Management (OAM) network.

The RR 105 makes a routing decision for client requests from the UEs 120. The RR 105 is a central control component within CDN 100. DNs 125 are geographically distributed and cache the contents for the origin server 115, closer to the UEs 120. The DNs 125 deliver the cached contents to the UEs 120 of the end users. In FIG. 1, the delivery nodes 125 are deployed in three tiers (130, 135, 140) to reduces the bandwidth usage towards origin server 115 when massive client requests for the same content are received, such as during a live broadcast event. The reduction of bandwidth towards the origin server 115 is achieved through the tree structure of the CDN 100 and clever replication of the content in selected DN(s).

Originally, CDNs were designed to handle video traffic, which normally present large media files. With the invention of Adaptive Bit Rate (ABR) technology, large video files are split into a list of smaller files (also called chunks). Then, instead of caching and delivering a large file, the DNs of the CDNs cache and deliver small data files, or chunks (also called segment files) to the clients UEs 120.

It is known that file size and the number of files handled by the DNs 125 have a significant impact on the performance of the DNs 125, due to storage operation such as read/write Input/Output (I/O) operations.

The performance of the DNs 125 can be optimally tuned specifically for video traffic. However, it is difficult to get good performances from the DNs 125 handling a mixture of different types of traffic. Nevertheless, in order to optimize operation and minimize the number of needed DNs 125 in the CDN 100, CDN operator need to use the CDN 100 to deliver not only video traffic but also mixed web traffic, which comprise file sizes varying from very small, a few bits, to large, a few megabites (MB).

When DNs 125 handles a mixture of traffic, such as live video content, Video-on-Demand (VoD) and other web traffic, the performance of the DNs 125 that were originally tuned for video traffic degrade significantly. This leads to overall performance degradation of CDN 100.

SUMMARY

There is provided a method, executed in a delivery node, for optimizing delivery of a content in a content delivery network. The method comprises receiving a request for the content, obtaining a determination of whether or not a category of content is associated with the requested content and responsive to the determination that no category of content is associated with the requested content, forwarding the request for the content towards an origin server and upon receiving a response from the origin server serving the content.

There is provided a delivery node, comprising processing circuitry and a memory, the memory containing instructions executable by the processing circuitry whereby the delivery node is operative to receive a request for a content. The delivery node is operative to obtain a determination of whether or not a category of content is associated with the requested content and responsive to the determination that no category of content is associated with the requested content, forward the request for the content towards an origin server and upon receiving a response from the origin server serve the content.

There is provided a content delivery network optimized to deliver content of different categories. The content delivery network comprises a plurality of delivery nodes as previously described. The content delivery network comprises a data processing service, operative to obtain samples or data sets from the plurality of delivery nodes and assemble the samples or data sets from the plurality of delivery nodes into training and validation data formatted to be used for training and validating a neural network. The content delivery network comprises a neural network training service, operative to obtain the training and validation data and train and validate the neural network using the training and validation data. The content delivery network comprises a configuration service, operative to obtain the trained and validated neural network and configure the plurality of delivery nodes with the trained and validated neural network.

There is provided a non-transitory computer readable media having stored thereon instructions for executing any one of the steps of the methods described herein.

There is provided a service instance for optimizing delivery of a content in a content delivery network, running in a cloud computing environment providing processing circuitry, interface circuitry and memory for running the service instance, the memory containing instructions executable by the processing circuitry whereby the service instance is operative to execute any one of the steps of the methods described herein.

The method and delivery node provided herein present improvements to the way content delivery networks and delivery nodes, which are described in the previous section, and methods executed therein, operate.

The methods and delivery node/caching server provided here allows a CDN Operator to utilize the delivery node/caching server to deal with a mixture of traffic pattern. It allows the content provider to reduce risk of having traffic overload on its origin server and to benefit from the fast response from the delivery node/caching server to its clients' requests. The content consumer/end user benefits by having a good user experience.

DETAILED DESCRIPTION

Various features and embodiments will now be described with reference to the drawings to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions or simultaneously. Furthermore, in some illustrations, some blocks, functions or actions may be optional and may or may not be executed; these are generally illustrated with dashed lines.

The present disclosure proposes to take samples from the contents served by the delivery nodes (either video, audio, text, or any other type of content), and to feed these samples to a trained Neural Network (NN) model in the delivery nodes. The neural network, when presented with such a content sample, outputs a predicted traffic category. Based on the predicted traffic category, the DNs adjust the access policy for incoming Uniform Resource Locators (URLs) so that the DNs redirect client requests to the delivery node best tuned for that category of traffic.

Figure 2:
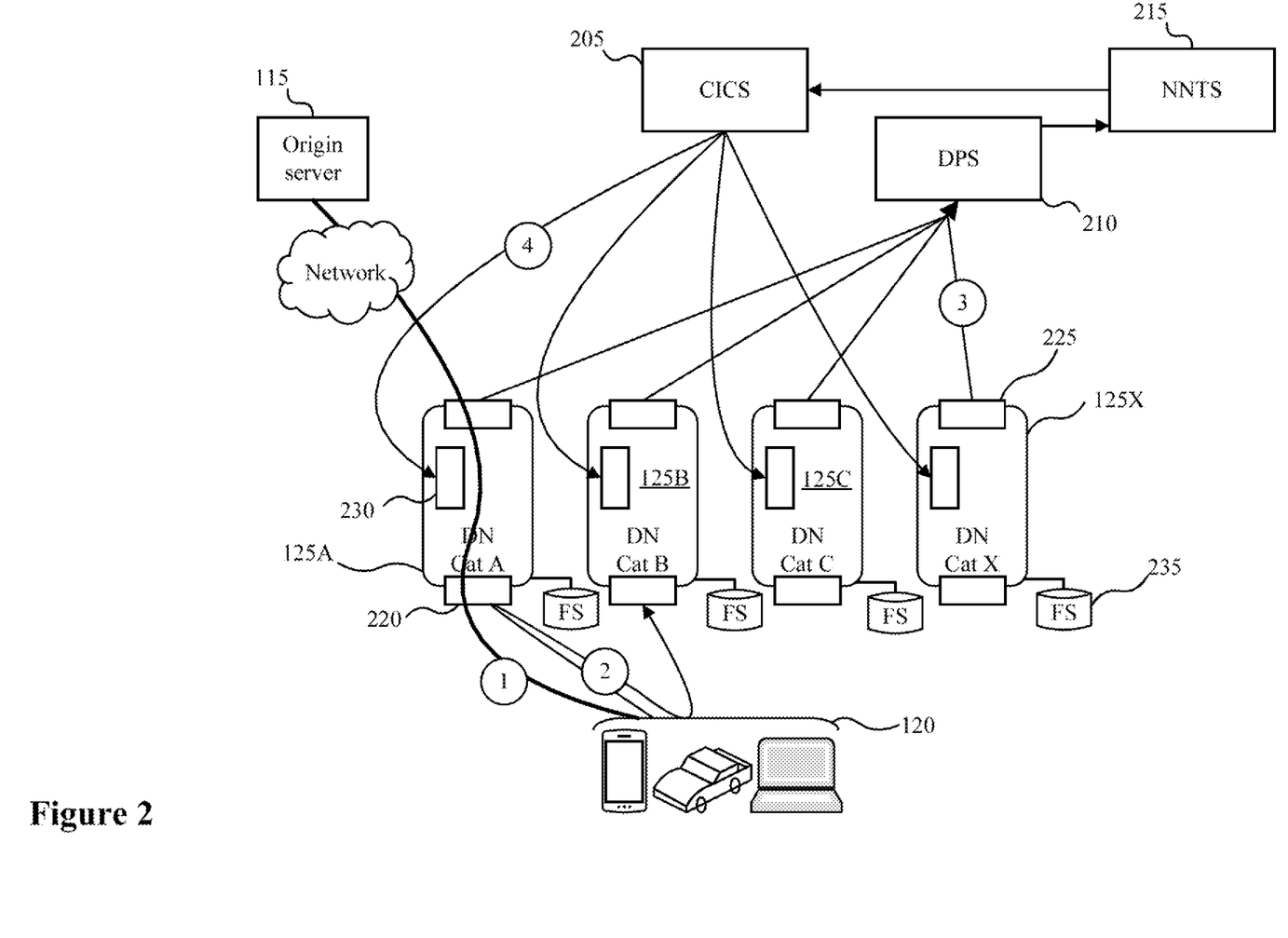
FIG. 2 is a schematic illustration of a part of a CDN and its environment according to an embodiment.

Referring to FIG. 2, four delivery nodes 125 (125A-125X) are deployed within a CDN. Each delivery node 125 is tuned for a given category or pattern of traffic. For example, there is a DN tuned for category (Cat) A 125A, one for category B, one for category c and one for category X 125X.

The delivery nodes comprise an access policy control service (APCS) 220, a sample collector service (SCS) 225 and a trained neural network model (TNNM) 230. The DNs also have access to a (FS) 235, in which the contents are cached.

Following the path indicated with a circled 1, a client 120 asks for a content in category A. The request goes through the DN Cat A 125A, to the origin server 115 having the content. The DN Cat A 125A then caches and serves the content. However, when a client 120 asks for a content in category B, now following the path indicated with a circled 2, the DN Cat A 125A is selected based on location (or proximity) and receives the request from the client 120. Since the requested content is in category B, DN Cat A 125A redirects the client request to DN Cat B 125B which is tuned for the category B of traffic. This is realized through the access policy that is stored in the delivery nodes, which are aware of which DN is tuned for which category of traffic.

In order to keep the neural network of the DNs up to date, three other services are provided: the Central Intelligent Controller Service (CICS) 205, which is used for configuring the DNs, the Data Processing Service (DPS) 210, which is used to gather data samples for providing to the neural Network Training Service (NNTS) 215. The NNTS 215 is the service training the neural network that will be used for content classification/sorting in the different categories of content, the categories indicating to which DNs the request should be redirected.

Following the path indicated with a circled 3, data samples are collected by the DNs and provided to the DPS, which prepares data for feeding to the NNTS for training of the neural network. Once the NN is trained, it is sent to the CICS which updates the configuration of the DNs by providing the DNs with a new version of the NN, following the path indicated with a circled 4.

Figure 3A:
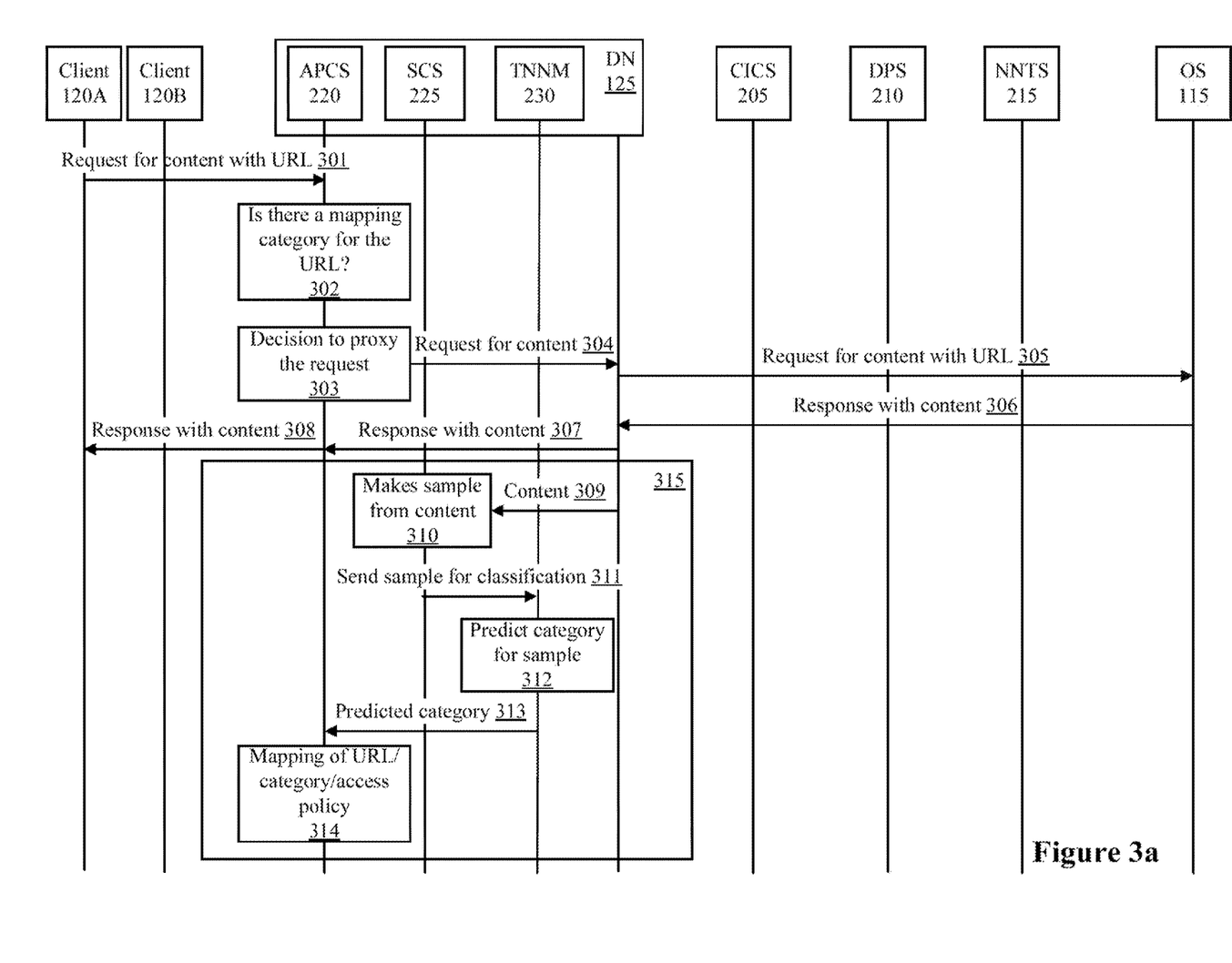
FIGS. 3a and b present a flow diagram of traffic and configuration according to an embodiment.
Figure 3B:
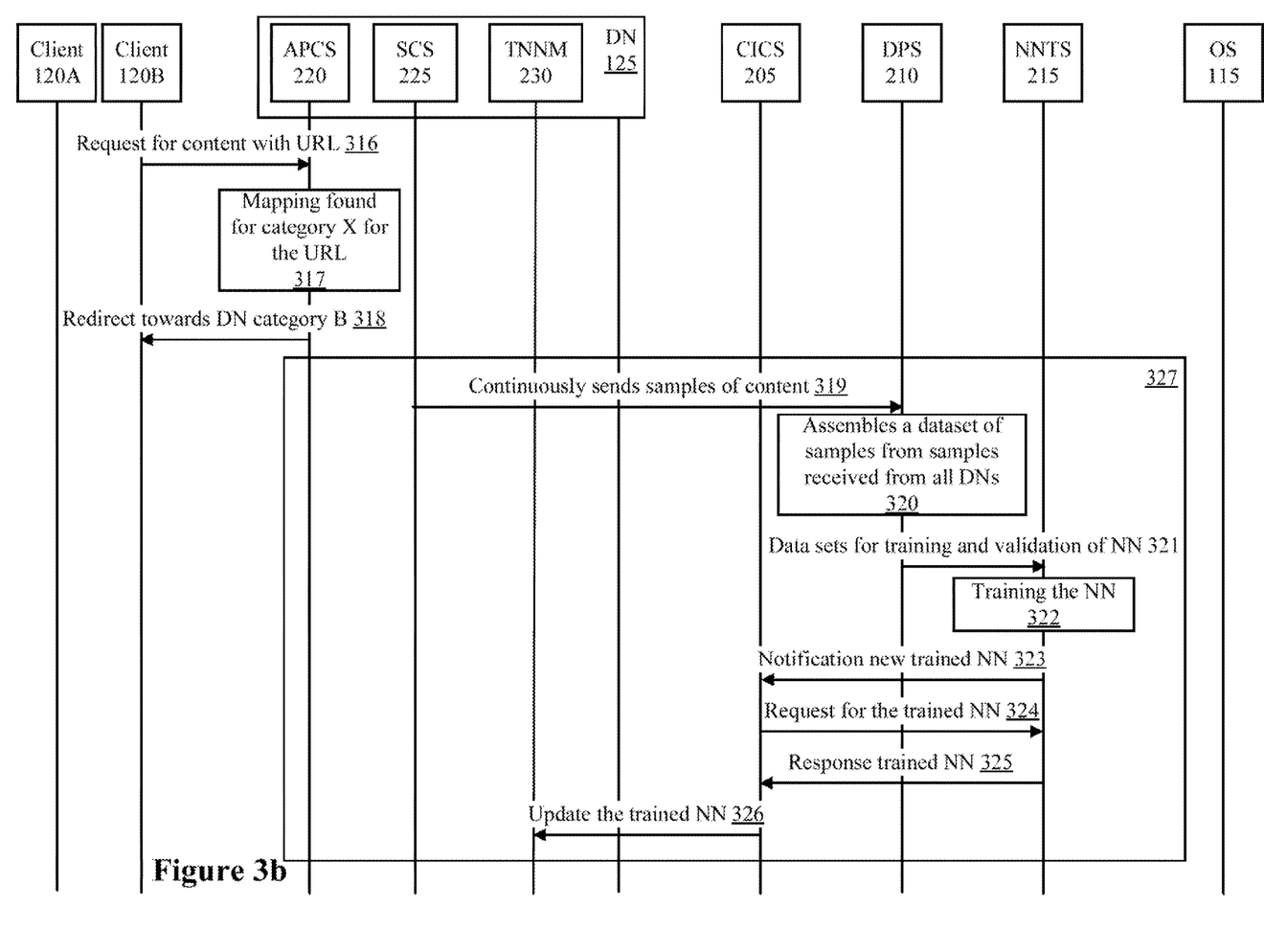

FIG. 3 describes in more details the functions of the DPS, CICS and NNTS services as well as how the trained NN model is used to adjust the access policy in the DNs.

Turning to FIG. 3*a*, Alice's client device 120A sends a request, step 301, for some content on the origin server through the DN 125. The request typically contains a URL, and can take a form such as: GET HTTP://www.cp.com/video/asset/assetID-1.ts. The access policy control service 220 of the DN 125 receives and processes the client request from Alice, applying the access policy, step 302. The APCS 220 checks if the incoming URL is in any of the given categories associated with a DN in the CDN. If the URL is not recognized, and therefore is not associated with any category, the APCS 220 of the DN 125 decides to proxy, steps 303 and 304, this request to the origin server 115, including the URL. The DN 125 forwards the client request to the origin server 115, step 305. The origin server 115 sends the response, such as 200 OK, with the content, back to the DN 125, step 306. The DN proxies the response back to the client device 120A, through the APCS 220, steps 307 and 308. Again, the response can be a 200 OK accompanied with the content.

Once or while the content is served to the client, the content is also sent to the sample collector service 225 (the 200 OK can still be used for sending the content), step 309, and the SCS 225 makes a sample (or data set) from the received content at step 310. The sample or data set may or may not contain the URL.

The sample or data set is sent to the trained neural network model 230, of the delivery node 125, step 311. The TNNM 230 then predicts a category for the sample and by consequence for the content, step 312. In this step, the TNNM correlates the category with the requested URL if the URL is included in the sample or data set. In an alternative embodiment the correlation category/URL could be done by the APCS. The output of the TNNM 230, which is the predicted category, such as category X, or the correlation category/URL, is then provided to the access policy control service 220, step 313. If not already done, the access policy control service 210 correlates or maps the client request URL to the predicted category and adds the requested URL into the predicted category for the access policy (it inserts this mapping into the access policy), step 314. The box 315 is the process for adjusting the access policy based on the outcome of the trained neural network, it includes steps 309 to 314.

Continuing with FIG. 3*b*, Bob, the other client 120B, sends a request for the same content previously requested by Alice, step 316. The request can take a form such as: GET HTTP://www.cp.com/video/asset/assetID-1.ts. The APCS 220 of DN 125 receives the request and applies the access policy. A mapping is found, and category X is matched with the URL provided by Bob, step 317. The DN 125 is then able to redirect Bob's request for the URL to the DN serving content associated with (or tuned for) the category X, step 318. The redirect can take the form of a 302/307 message.

The remaining steps to get the content are not shown, for simplicity. At this point, it is the second time category X is assigned to this content, but this time the right node associated with this category of content delivers the content to the user.

All the while, or after step 318, the sample collector service 225 takes samples from the contents, the samples being created at step 310, and forward these samples to the data processing service 210, step 319. The DPS 210 collects samples from different delivery nodes 125 over a predetermined time period and assembles/prepares data sets of samples for training and validating a neural network (NN) by the Neural Network Training Service (NNTS) 215, step 320. The data sets are sent from the DPS 210 to the NNTS 215, at step 321. Then, the NNTS 215 trains the neural network, step 322, which may take a substantial amount of time depending on the type of neural network as well as on the configuration of the selected neural network. After the convergence is achieved and the neural network is trained and ready to use, the NNTS 215 notifies the CICS that a new trained NN is ready and available, step 323. The CICS 205 requests the new NN at step 324 and receives the trained NN model from the NNTS 215, with weight coefficients and NN architecture, step 325. The CICS 205 then pushes the trained NN model (TNNM) to the delivery nodes 125, step 326. In an alternative embodiment, steps 323 to 325 could be combined and the NNTS 215 could push the trained NN to the CICS 205 once it is ready. The box 327 is the process for collecting samples and for training the NN, it includes steps 319 to 326. These steps can be done in parallel to normal activities of the DNs 125. Collecting samples and training a new NN model or update an existing NN model can be done at regular intervals, or when a number of samples have been accumulated, or according to any other suitable criteria. Although only one DN is illustrated in FIGS. 3a and b, it should be understood that the CICS 205 can provide the NN to a plurality of DNs 125 or to all DNs 125 in a CDN 100.

Figure 4:
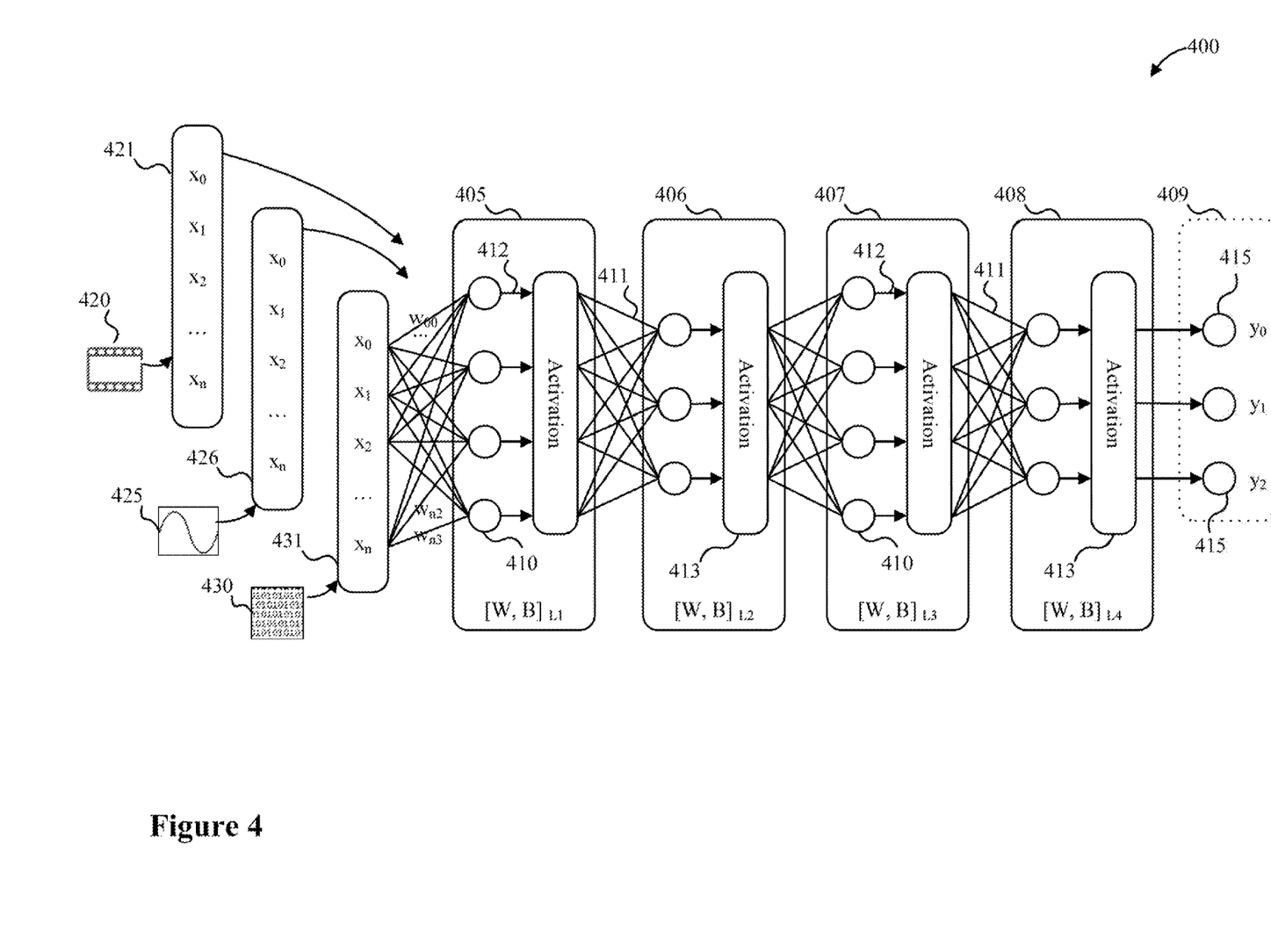
FIG. 4 is a schematic illustration of a neural network and data sets used for training the NN.

FIG. 4 illustrates an example neural network 400 that can be trained by the NNTS 215. A person skilled in the art will understand that many different types of neural networks exist and that the illustrated NN is only a simplified example to illustrate how a NN can be trained to categorize content when presented with data samples. Examples of types of NN include Feedforward, Radial basis function, Recurrent, Modular, etc. and a person skilled in the art would know how to choose an appropriate NN for a particular application, and how to configure, train and use these different types of NN. The NN model can be built based on a number of layer and a number of neurons in each layer. Some technical methods for dealing with overfitting or underfitting might also be applied. Overfitting occurs when the model is over specified. The outcome of overfitting is that the trained model is not general enough and catches too many details based on the training dataset. This leads to inaccurate prediction on a non-training dataset. Underfitting occurs when the model is under specified. The outcome of underfitting is that the trained model is too general and misses some details based on the training dataset. This also leads to inaccurate prediction on a non-training dataset.

The example NN 400 of FIG. 4 comprises five layers: an input layer 405, hidden layers 406-408 and an output layer 409. Although five layers are shown, some variations of neural network 400, for example a NN used in deep learning context, can alternatively comprise up to tens or hundreds of hidden layers 406-408, depending on the complexity of the data samples to process.

Each layer of NN 400 comprise neurons 410, which mathematical models can be found in books published on the subject. One simple example of formula that can be used to model a neuron 410 is $y=w*x+b$, where x is the input and y is the output, w is a coefficient and b is a bias.

The coefficients (W, B) at each layer are tuned, during the learning process, to minimize a "loss function" during the training process. The loss function is defined to measure how accurate the prediction is. The coefficients in each layer may be given arbitrary numbers, at beginning. For simplicity, those arbitrary numbers might be given based on certain distribution around zero. Eventually, with the training dataset, the neurons are trained to converge to certain values, which forms the model that can be used to do the prediction on any non-training dataset.

The neurons 410 receive inputs 411, also illustrated by the lines connecting a previous layer to the neurons 410. These inputs are weighted (indicated only for some inputs with $w_{00}$, $w_{n2}$ and $w_{n3}$) and these weights can be applied as, for example, a multiplying factor to the input. The outputs 412 of the neurons 410 are then sent to the activation layer 413 which applies an activation function such as a sigmod (or sigmoid) or ReLU (or rectifier) function or any other appropriate activation function to the outputs 412. The activation function introduces non-linearity on top of the output y.

The final layer 409 of the NN is the output layer and, in the provided example, only one output neuron 415 of this layer gets activated for a given input, each neuron 415 being associated with, or corresponding to, a given "content category".

As shown in FIG. 4, the NN 400 takes arrays as inputs, each element of the array being weighted and fed into an input neuron. There are many algorithms to digitalize contents according to their content type, for instance any content that can be communicated such as audio, video, picture, text, etc. For example, contents can be digitized based on a content-type header, if present. Another way could be to directly use a fixed number of bits from the start of the content file to fill the array to be fed to the NN 400. Any other appropriate method could also be used.

In the example of FIG. 4, input content 420 is a video sample. A video consists of several pictures, but also of other characteristics such as encoding, header, etc. Any of these images and/or characteristics can be used/converted and inserted/combined into an array 421. The resulting array 421 is a digital representation of the sample video that can be fed into the neural network 400. To represent a video 420 as an array 421, the array should contain characteristics that the NN 400 can associate with a video file.

Input content 425 is an audio sample. Audio consists of a digitized waveform, but also other characteristics such as encoding, header, etc. Any of these characteristics as well as parts of the digitized waveform can be used/converted and inserted/combined into an array 426. The resulting array 426 is a digital representation of the sample audio that can be fed into the neural network 400. To represent audio 425 as an array 426, the array should contain characteristics that the NN 400 can associate with an audio file.

Input content 430 is, for example, a text file. A text file consists of characters and other formatting, but also of other characteristics such as a header. Any of these characteristics, characters, formatting can be used/converted and inserted/combined into an array 431. The resulting array 431 is a digital representation of the text sample that can be fed into the neural network 400. To represent a text file 430 as an array 431, the array should contain characteristics that the NN 400 can associate with a text file.

As said previously, a fixed number of any consecutive or non-consecutive bits, byte or other data representation that can be made common to all types data content could also be used to form the arrays to be fed to the NN 400. It could also be envisioned that for some shorter types of content, the input array would contain actual content in one part and some kind of padding for a remaining part. A NN could also learn to classify such type of content having an array containing padding.

Once the NNTS 215 has finished training and validating the NN 400, the NN model is sent to the CICS 205, which configures the DNs 125 with the trained NN model, as explained previously.

Figure 5A:
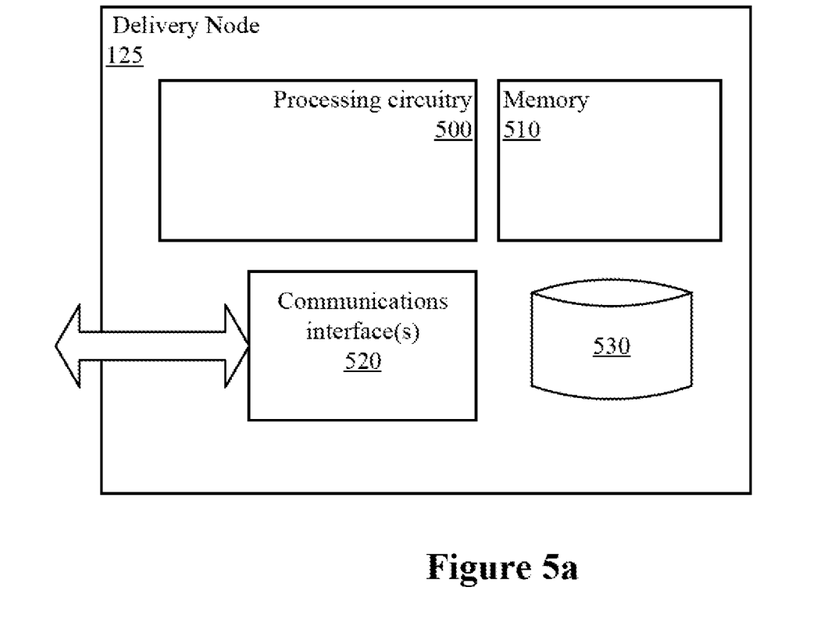
FIGS. 5a and b are schematic illustrations of delivery nodes according to some embodiments.

FIG. 5*a* is a block diagram of a delivery node 125 suitable for implementing aspects of the embodiments disclosed herein. As discussed above, the DN 125 is used in the context of CDNs. The delivery node 125 includes a communications interface 520 which generally includes analog and/or digital components for sending and receiving communications to and from client devices 120, as well as sending and receiving communications to and from other delivery node 125 or other network nodes, either directly or via a network. Those skilled in the art will appreciate that the block diagram of the delivery node 125 necessarily omits numerous features that are not necessary for a complete understanding of this disclosure.

Although all of the details of the delivery node 125 are not illustrated, the delivery node 125 comprises one or several general-purpose or special-purpose processors or processing circuitry 500 or other microcontrollers programmed with suitable software programming instructions and/or firmware to carry out some or all of the functionality of the delivery node 125 described herein. In addition, or alternatively, the delivery node 125 may comprise various digital hardware blocks (e.g., one or more Application Specific Integrated Circuits (ASICs), one or more off-the-shelf digital or analog hardware components, or a combination thereof) (not illustrated) configured to carry out some or all of the functionality of the delivery node 125 described herein. A memory 510, such as a random access memory (RAM), may be used by the processing circuitry 500 to store data and programming instructions which, when executed by the processing circuitry 500, implement all or part of the functionality described herein. The delivery node 125 may also include one or more storage media 530 for storing contents, data necessary and/or suitable for implementing the functionality described herein, as well as for storing the programming instructions which, when executed on the processing circuitry 500, implement all or part of the functionality described herein. One embodiment of the present disclosure may be implemented as a computer program product that is stored on a computer-readable storage medium 530, the computer program product including programming instructions that are configured to cause the processing circuitry 500 to carry out the steps described herein.

Figure 5B:
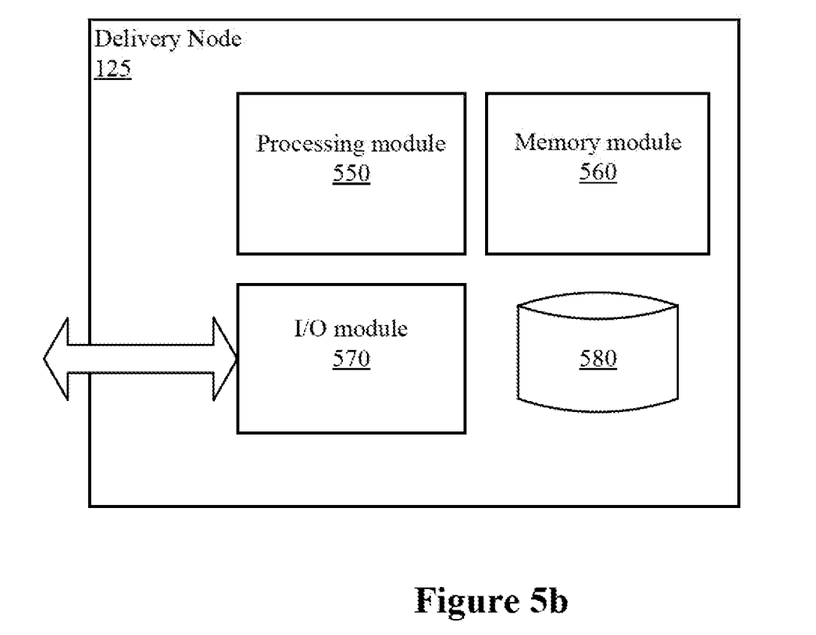

Any appropriate steps, methods, features, functions, or benefits disclosed herein may be performed through one or more functional units or modules of one or more virtual apparatuses, such as the virtual apparatus illustrated in FIG. 5*b*. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure. Virtual delivery node 125 of FIG. 5*b* comprises a processing module 550, a memory module 560, I/O module 570 and storage module 580. These functional units or modules may be used for implementing steps of the methods described herein.

Figure 6:
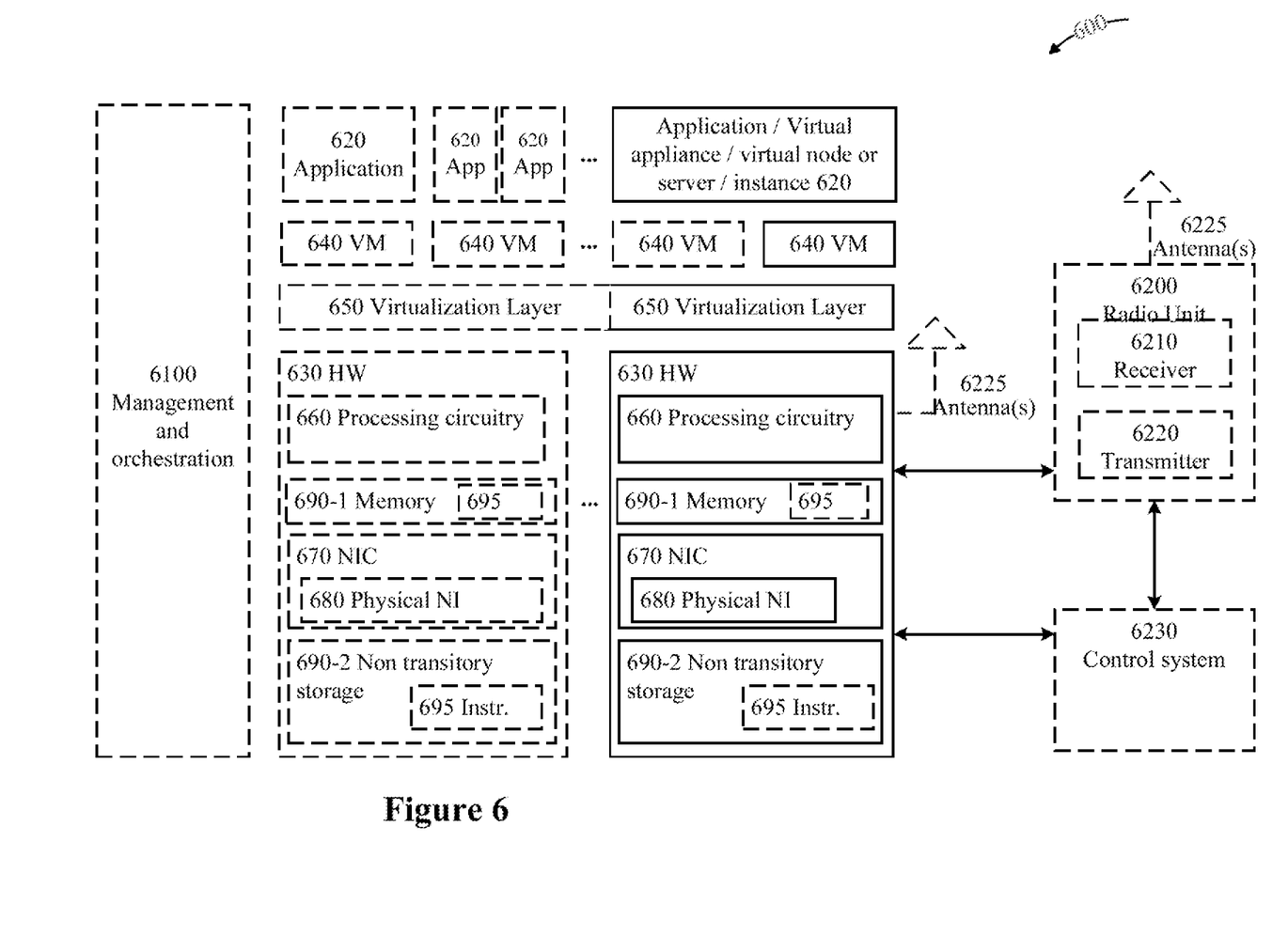
FIG. 6 is a schematic illustration of a virtualization environment in which functions of some embodiments may be implemented.

FIG. 6 is a schematic block diagram illustrating a virtualization environment 600 in which functions implemented by some embodiments may be virtualized. As used herein, virtualization can be applied to the delivery node or to other network nodes and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines or containers implemented in one or more virtual environments 600 hosted by one or more of hardware nodes 630. Further, in embodiments in which the virtual node is not a radio access node or does not require radio connectivity (e.g., a core network node or CDN node), then the network node may be entirely virtualized.

The functions may be implemented by one or more applications 620 (which may alternatively be called software instances, virtual appliances, network functions, virtual nodes, virtual network functions, etc.) operative to implement steps of some methods according to some embodiments. Applications 620 run in virtualization environment 600 which provides hardware 630 comprising processing circuitry 660 and memory 690. Memory 690 contains instructions 695 executable by processing circuitry 660 whereby application 620 is operative to provide any of the relevant features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by the processing circuitry 660. Each hardware devices may comprise one or more network interface controllers 670 (NICs), also known as network interface cards, which include physical network interface 680. Each hardware devices may also include non-transitory, persistent, machine readable storage media 690-2 having stored therein software 695 and/or instruction executable by processing circuitry 660. Software 695 may include any type of software including software for instantiating one or more virtualization layers 650 (also referred to as hypervisors), software to execute virtual machines or containers 640 as well as software allowing to execute functions described in relation with some embodiments described herein.

Virtual machines or containers 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines or containers 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine or containers 640.

As shown in FIG. 6, hardware 630 may be a standalone network node, with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a virtual machine or containers 640 is a software implementation of a physical machine that runs programs as if they were executing on a physical, non-virtualized machine. Each of virtual machines or containers 640, and that part of the hardware 630 that executes that virtual machine, be it hardware dedicated to that virtual machine and/or hardware shared by that virtual machine with others of the virtual machines or containers 640, forms a separate virtual network elements (VNE).

Still in the context of NFV, Virtual Network Function (VNF) is responsible for handling specific network functions that run in one or more virtual machines or containers 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be effected with the use of control system 6230 which may alternatively be used for communication between the hardware nodes 630 and the radio units 6200.

Figure 7:
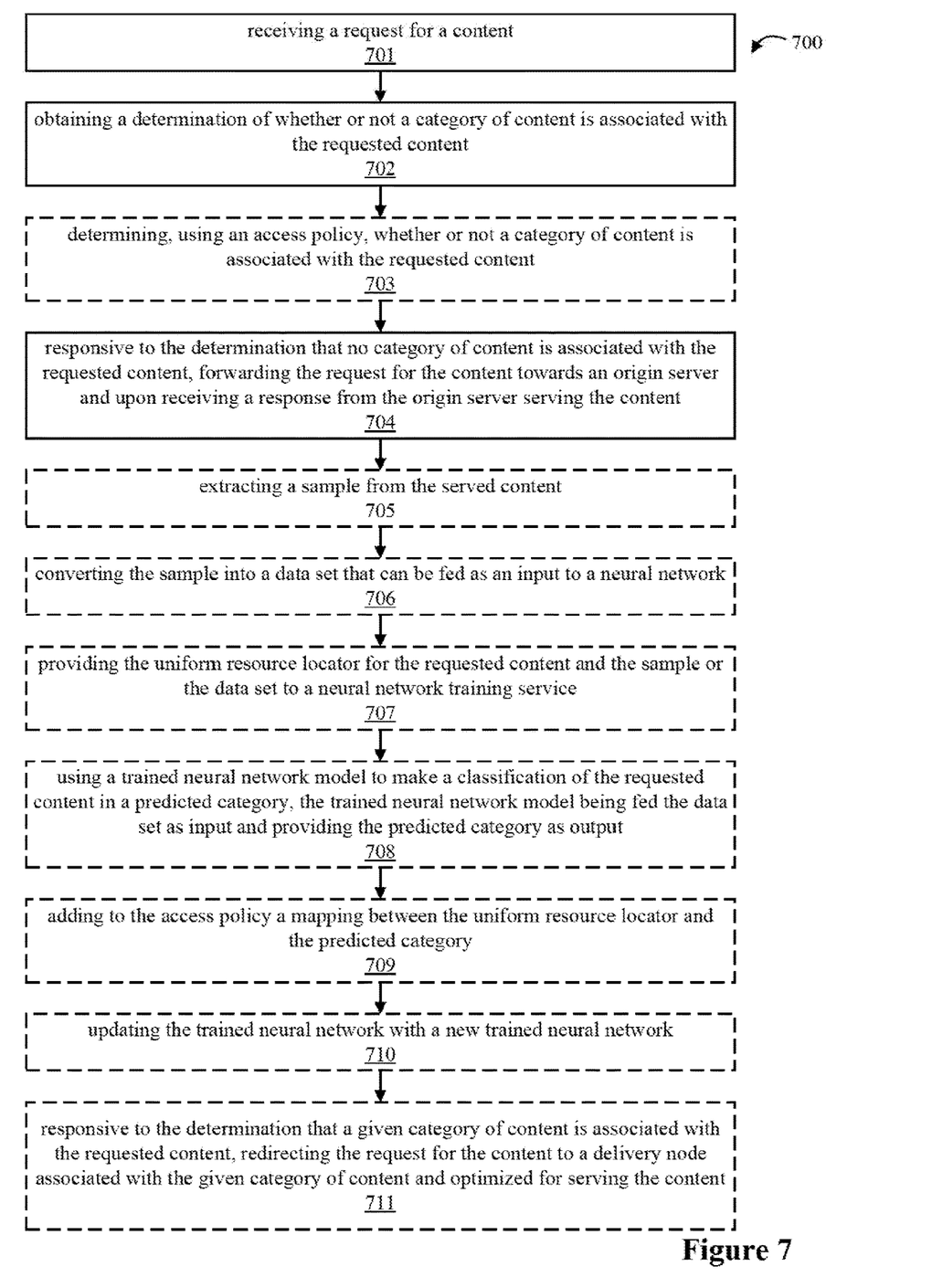
FIG. 7 is a flowchart of a method according to an embodiment.

FIG. 7 illustrates a method 700 according to an embodiment which may be executed in a delivery node 125 such as illustrated in FIG. 5a, in a virtual delivery node 125 such as illustrated in FIG. 5b or in a virtualization environment 600, as a software instance, virtual appliance, network function, virtual node or as a virtual network function. The method 700 is executed by a delivery node and is for optimizing delivery of content in a content delivery network. The method comprises receiving a request for a content, step 701. The method comprises obtaining a determination of whether or not a category of content is associated with the requested content, step 702. The method may further comprise, determining, by the delivery node 125, using an access policy, whether or not a category of content is associated with the requested content, step 703. The method comprises, responsive to the determination that no category of content is associated with the requested content, forwarding the request for the content towards an origin server and upon receiving a response from the origin server serving the content, step 704.

The request for the content may comprise a uniform resource locator for the content. Other types of content identifiers could also be envisioned and would not affect the working of this method. The access policy may contain a mapping between the uniform resource locator and the given category of content. In that case, i.e. responsive to the determination that a given category of content is associated with the requested content, the method may comprise redirecting the request for the content to a delivery node associated with the given category of content and optimized for serving the content, step 711.

If it is determined that no category of content is associated with the requested content, the method may comprise extracting a sample from the served content, step 705. A method for extracting a sample from the served content has been previously described in relation with FIG. 3a, for example, and the method 700 may further comprise any of the steps described in relation with FIG. 3a. The method may further comprise converting the sample into a data set that can be fed as an input to a neural network, step 706. A method for converting a sample into a data set has been previously described in relation with FIG. 4, for example, and the method 700 may further comprise any of the steps described in relation with FIG. 4. The method may further comprise providing the uniform resource locator for the requested content and the sample or the data set to a neural network training service, step 707. It should be understood that it is possible to build the NN model using URL as a part of input data, but that the NN model could also be built without using the URL as part of the input data. Of course, if the URL is used as part of the input data, then the correlation between the URL and the content is inscribed within the NN model.

Once a sample is extracted, the delivery node may use a trained neural network model 230 to make a classification of the requested content in a predicted category, the trained neural network model 230 being fed the data set as input and providing the predicted category as output, step 708. Following that, the method may further comprise adding to the access policy a mapping between the uniform resource locator and the predicted category, step 709.

In the meantime, the NNTS may have trained a new neural network, as illustrated in FIG. 3b, and the method may further comprise updating the trained neural network with a new trained neural network model, step 710. A method for training a new neural network has been previously described in relation with FIG. 3b, for example, and the method 700 may further comprise any of the steps described in relation with FIG. 3b.

Referring again to FIG. 5, there is provided a delivery node 125. The delivery node 125 comprises processing circuitry 500 and a memory 510. The memory 510 contains instructions executable by the processing circuitry whereby the delivery node is operative to receive a request for a content. The delivery node is operative to obtain a determination of whether or not a category of content is associated with the requested content. The delivery node is operative to, responsive to the determination that no category of content is associated with the requested content, forward the request for the content towards an origin server and upon receiving a response from the origin server, serve the content. The delivery node may further be operative to execute an access policy service which determines, using an access policy, whether or not a category of content is associated with the requested content. The request for the content may comprise a uniform resource locator for the content. The access policy may contain a mapping between the uniform resource locator and the given category of content. In the case where there is a mapping, i.e. responsive to the determination that a given category of content is associated with the requested content, the delivery node may further be operative to redirect the request for the content to a delivery node associated with the given category of content and optimized for serving the content.

In the case where there is no mapping, i.e. upon determination that no category of content is associated with the requested content, the delivery node may further be operative to execute a sample collector service which extract a sample from the served content. The sample collector service may be operative to convert the sample into a data set that can be fed as an input to a neural network. The delivery node may further be operative to provide the uniform resource locator for the requested content and the sample or the data set to a data processing service. The delivery node may further be operative to execute a classification service, the classification service using a trained neural network model to make a classification of the requested content in a predicted category, the trained neural network model being fed the data set as input and providing the predicted category as output. The predicted category may be provided to the access policy service which adds to the access policy a mapping between the uniform resource locator and the predicted category. The delivery node may further be operative to update the trained neural network with a new trained neural network model. A delivery node has been previously described in relation with FIGS. 2 and 3, for example, and the delivery node 125 may further comprise any of the components described in relation with FIG. 2 and may execute any of the steps described in relation with FIG. 3.

Referring back to FIG. 2, a content delivery network optimized to deliver content of different categories, comprises: a plurality of delivery nodes 125A-125X as described previously. The CDN further comprises a data processing service 210, operative to obtain samples or data sets from the plurality of delivery nodes and to assemble the samples or data sets from the plurality of delivery nodes into training and validation data formatted to be used for training and validating a neural network. The CDN further comprises a neural network training service 215, operative to obtain the training and validation data, and to train and validate the neural network using the training and validation data. The CDN further comprises a configuration service 205, operative to obtain the trained and validated neural network and to configure the plurality of delivery nodes 125A-125X with the trained and validated neural network.

Referring again to FIGS. 5 and 6, there is provided a non-transitory computer readable media 530, 580, 690-2, having stored thereon instructions for executing any one of the steps of the methods described herein.

Referring to FIG. 6, there is provided a service instance 620 for optimizing delivery of content in a content delivery network, running in a cloud computing environment 600 providing processing circuitry 660, interface circuitry 670 and memory 690 for running the service instance 620, the memory 690 containing instructions executable by the processing circuitry 660 whereby the service instance 620 is operative to execute any one of the steps of the methods described herein.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method, executed in a delivery node, for optimizing delivery of a content in a content delivery network, comprising:
   receiving a request for the content;
   obtaining, using an access policy, a determination of whether or not a category of content is associated with the content;
   responsive to the determination that no category of content is associated with the content, forwarding the request for the content to an origin server and, upon receiving a response from the origin server;
   extracting a sample from the content;
   converting the sample into a data set for input to a trained neural network;
   using the trained neural network to make a classification of the content in a predicted category, by inputting the data set into the trained neural network, to provide the predicted category as output; and
   adding to the access policy a mapping between a uniform resource locator and the predicted category;
   serving the content; and
   responsive to the determination that a category of content is associated with the content, redirecting the request for the content to a second delivery node associated with the category of content and optimized for serving the content.

2. The method of claim 1, wherein the request for the content comprises the uniform resource locator for the content.

3. The method of claim 1, wherein the access policy contains a mapping between the uniform resource locator and the category of content.

4. The method of claim 3, further comprising providing the uniform resource locator for the content and the sample or the data set to a neural network training service.

5. The method of claim 1, further comprising updating the trained neural network model with a new trained neural network.

6. A delivery node, comprising processing circuitry and a memory, the memory containing instructions executable by the processing circuitry whereby the delivery node is operative to:
   receive a request for a content;
   obtain, using an access policy, a determination of whether or not a category of content is associated with the content;

responsive to the determination that no category of content is associated with the content, forward the request for the content to an origin server and, upon receiving a response from the origin server;
    extract a sample from the content;
    convert the sample into a data set for input to a trained neural network;
    use the trained neural network to make a classification of the content in a predicted category, by inputting the data set into the trained neural network, to provide the predicted category as output; and
    add to the access policy a mapping between a uniform resource locator and the predicted category;
    serve the content; and
responsive to the determination that a category of content is associated with the content, redirect the request for the content to a second delivery node associated with the given category of content and optimized for serving the content.

7. The delivery node of claim 6, wherein the request for the content comprises the uniform resource locator for the content.

8. The delivery node of claim 6, wherein the access policy contains a mapping between the uniform resource locator and a given category of content.

9. The delivery node of claim 8, further operative to provide the uniform resource locator for the requested content and the sample or the data set to a data processing service.

10. The delivery node of claim 6, further operative to update the trained neural network with a new trained neural network model.

* * * * *